Figure 1:
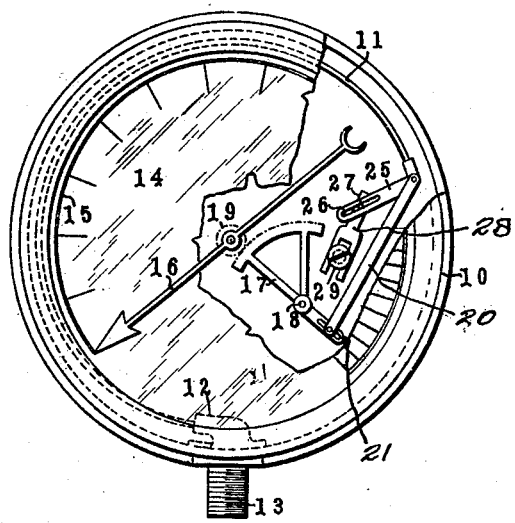

May 18, 1926.

W. B. RICE

INDICATING DEVICE

Filed Nov. 18, 1922

1,584,806

INVENTOR
Willis B. Rice
BY
Duell, Warfield & Duell
ATTORNEY

Patented May 18, 1926.

1,584,806

UNITED STATES PATENT OFFICE.

WILLIS B. RICE, OF NEW YORK, N. Y., ASSIGNOR TO MANNING, MAXWELL & MOORE, INC., OF NEW YORK, N. Y., A CORPORATION OF NEW JERSEY.

INDICATING DEVICE.

Application filed November 18, 1922. Serial No. 601,679.

This invention relates to indicating devices and more particularly to indicating devices arranged to have scale readings extending beyond the normal range.

The principal object of the invention is to improve indicators of that type which comprises a movable index and a pressure responsive element for actuating it by providing means for decreasing the responsiveness of said element to further increase in pressure after a selected pressure has been attained, and also to provide for variation within a certain range of pressure of the pressure at which such change in responsiveness shall take place.

The invention accordingly consists in the features of construction, combinations of elements and arrangement of parts which will be exemplified in the construction hereinafter set forth, and the scope of the application of which will be indicated in the following claim.

In the accompanying drawing, similar reference characters refer to similar parts throughout the several views.

Figure 2:
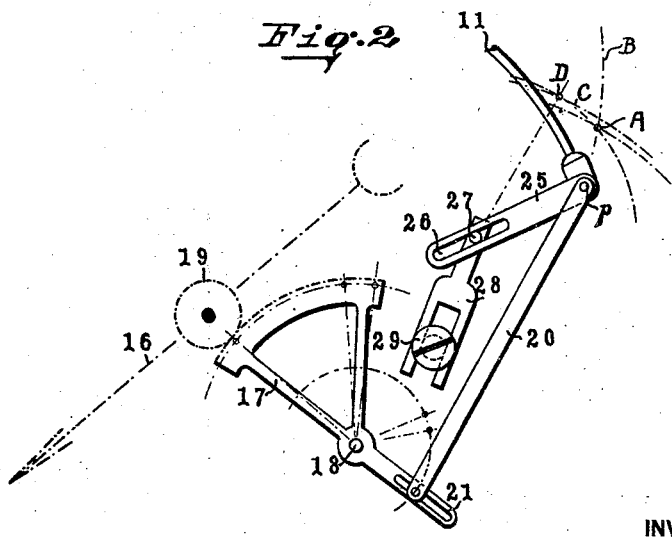

Figure 1 is a front elevation of a pressure gauge, with parts broken away, constructed in accordance with the invention, and Fig. 2 is an enlarged detail view of the moving parts.

In the present embodiment of the invention, which is shown in connection with a gauge using a Bourdon tube as the pressure responsive element, the tube is connected to the indicating member so that movement of the tube in response to pressure changes will operate the indicating element, the gauge being provided with means for changing the path of movement of the free end of the tube, which, for purposes of illustration, is shown as affecting the tube so that upon the attainment of a selected pressure the range of movement of the indicating member, as moved in response to the dilation of the Bourdon tube, is retarded or changed to a movement other than normal.

Referring to the drawings, the gauge 10 has a Bourdon tube 11 secured in a tubular support 12, and the support has a nipple 13 adapted to be connected with the source of pressure. The gauge has a dial 14, provided with a scale 15, over which the indicator, or hand 16, is adapted to be moved in order to give the pressure readings. The pressure responsive element or Bourdon tube is connected to the indicator to control operation of the same, by means of a link 20, a sector 17, and a pinion 19 rigid with the indicator. The sector is pivoted at 18 within the casing, and meshes with the pinion 19, and on the opposite side of the pivot 18 from the pinion the sector has an arm 21 which is longitudinally slotted. The link 20 is connected to the arm, by means of a bolt or the like passing through the slot, to permit adjustment of the link with respect to the arm.

In order to change the relation between the Bourdon tube and the indicator, above a selected pressure, mechanism is connected with the free end of the tube, for constraining the same at a selected point in the movement thereof to move over a different path. The said mechanism comprises a slotted link 25 which is pivoted to the end of the Bourdon tube at the connection between the link 20 and the tube, and the slot 26 of the link is engaged by a pin 27, on a fork shaped relatively fixed support 28. When the tube responds to a selected pressure, the end of the slot of the link 25 remote from the Bourdon tube will engage the pin 27. Since this pin is fixed, the end of the tube must move on an arc whose center is the pin 27. Normally the free end of the tube will move over the arc B, until it reaches the point A, when the pin 27 engages the end of the slot. The tube can now no longer move over the arc B, but instead is constrained to move over the arc C, and the relation between the end of the tube and the indicator is changed, the speed of movement of the indicator with respect to the movement of the Bourdon tube being materially lessened. When the pin 27 engages the end of the slot 26, the Bourdon tube or pressure responsive member moves in an abnormal path and the indicator for like pressures is moved over but a fraction of its normal range of scale. The support 28 is adjustable, the arms thereof engaging opposite sides of a screw 29, which has threaded connection with the rear wall of the casing 10. The head of the screw clamps the arms to the casing wall, and when it is loosened, the support may be adjusted, to change the position of the pin 27.

In operation, communication of pressure to the Bourdon tube causes its free end to move outwardly. The pull on the link 20 rotates the hand 16 from a zero position, in a clock-wise direction, to a point on the scale indicating the magnitude of the pressure which has dilated the tube. The tube 11 is free to move the hand 16 from the zero position to a point on the scale corresponding to the predetermined pressure at which the end of the slot 26 comes in contact with the pin 27. It is thus seen that for all pressures below this predetermined value the Bourdon tube 11 is free to expand and contract without interference from the link 25.

In the drawing, Fig. 2, the Bourdon tube 11 is shown in full lines in the zero position. The tube 11, as it expands normally, moves in a generally upward direction; when its pivot point $p$ has reached the point A in its outward travel, the end of slot 26 has come in contact with the pin 27. Consequently, the subsequent movement of the end of the Bourdon tube will be in a constrained path. The path of travel of the tube 11 will no longer be in the arc B but along the arc C. In this constrained path the pivot point $p$ of the tube may move from the position A to a position designated D. The arc C, as will be observed, swings about the pin 27 as a pivot. The expansion of the Bourdon tube, when moving along this constrained path, is such that the tube moves the hand 16 only a fraction of the distance over the scale which it would have moved for the same pressure increment, had the end of the Bourdon tube not been under constraint. Consequently, from the time when the end of the slot is brought into contact with the pin 27, the hand 16 will move over smaller scale divisions than for pressures below this point. Hence, the gauge may be graduated for pressure readings extending far beyond the normal for which the dial would have been graduated were no means for influencing the Bourdon tube employed.

By providing a set screw 29 for adjusting the position of the pin 27, the position of the pin may be adjusted in the gauge so that the extended scale reading may begin at any predetermined point. This construction is advantageous where it is desired to construct a number of gauges all beginning at this point, calibration being employed to determine the exact adjustment of the pin 27. Furthermore, by swinging the member 28 about the screw 29 as a pivot, the amount of constraint imposed upon the Bourdon tube 11 may be varied at will. Consequently, both the initial point at which the extended scale readings begin and the magnitude of their ratio to the normal scale readings can be controlled and varied as may be desired.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claim is intended to cover all of the generic and specific features of the invention herein described, and all statements of the scope of the invention which, as a matter of language, might be said to fall therebetween.

Having described my invention, what I claim as new and desire to secure by Letters Patent is:—

A pressure gage comprising a scale having two series of graduations, a movable index cooperable successively with the graduations of the two series, a Bourdon tube whose free extremity is normally free to move in a given path in direct ratio to successive increments in pressure in the tube, connections between said end of the tube and the index, an arm provided with an elongate slot at one end, a set screw engaging said slot for holding the arm in adjusted position but permitting both angular and longitudinal adjustment of the arm, a stop pin projecting from the arm, and a link having pivoted connection with the end of the Bourdon tube, said link having an elongate slot for the reception of the stop pin.

In testimony whereof I affix my signature.

WILLIS B. RICE.